United States Patent [19]

Gambini

[11] Patent Number: 5,561,975
[45] Date of Patent: Oct. 8, 1996

[54] FLUID COUPLING WITH DELAY CHAMBER AND RESERVOIR

[76] Inventor: Angelo Gambini, 11, Via Pastori-20010 Pogliano Milanese, Milan, Italy

[21] Appl. No.: 453,786

[22] Filed: May 30, 1995

[30] Foreign Application Priority Data

Jun. 29, 1994 [IT] Italy .................... MI94A1356

[51] Int. Cl.$^6$ .................................................. F16D 33/00
[52] U.S. Cl. ........................................ 60/338; 60/357
[58] Field of Search ....................... 60/330, 331, 338, 60/357

[56] References Cited

U.S. PATENT DOCUMENTS

| | | | |
|---|---|---|---|
| 3,999,385 | 12/1976 | Hoeller et al. | 60/330 |
| 4,516,399 | 5/1985 | Holler et al. | 60/357 X |
| 4,581,892 | 4/1986 | Ahrens et al. | 60/338 X |
| 4,703,840 | 11/1987 | Bopp | 60/338 |
| 4,761,952 | 8/1988 | Holler | 60/338 |
| 4,921,079 | 5/1990 | Vogelsane | 60/330 X |

*Primary Examiner*—Hoang Nguyen
*Attorney, Agent, or Firm*—Steinberg, Raskin & Davidson

[57] ABSTRACT

A fluid coupling (1) with a sealed casing (2) including two mutually communicating chambers (21, 23) and traversed by a driven shaft (10) connected to a user, one of said chambers (21) containing a pair of rotors (15, 17) provided with radial blades (16, 18), a driving first rotor (17) being operationally connected to a driving shaft and the driven second rotor (15) being associated with the driven shaft (10), the other chamber (23) acting as a delay chamber, the casing (2) containing a fluid arranged to transfer motion from the driving rotor (17) to the driven rotor (15). Within the sealed casing (2) there is provided at least one further chamber or reservoir (22) connected to said two chambers (21, 23) such as to feed the fluid contained in it to the delay chamber (23) with a delay subsequent to the starting of the motor, said fluid being transferred with a further delay to the working chamber (21) containing the rotors (15, 17).

12 Claims, 2 Drawing Sheets

FLUID COUPLING WITH DELAY CHAMBER AND RESERVOIR

FIELD OF THE INVENTION

This invention relates to a fluid coupling in accordance with the introduction to the main claim.

BACKGROUND OF THE INVENTION

Fluid couplings have been known for some time. They are advantageously used in particular for connecting a user to an electric motor or to a heat engine such as a diesel engine of the type used in the marine field.

It is known to construct fluid couplings provided with a delay chamber which, when the engine is not operating, contains a large part of the fluid for transmitting motion between the driving rotor and the driven rotor. Following the starting of the engine, this fluid passes, at a set rate, from the delay chamber to the working chamber containing the rotors, to allow progressive transfer of the drive torque from the driving rotor to the driven rotor, ie from the engine to the user. By suitably setting the rate of fluid passage from the delay chamber to the rotor chamber, the connection lag between the engine and the user can be regulated.

However, this known coupling-delay chamber arrangement does not enable an effective lag in said connection to be achieved because of obvious dimensional limitations on the coupling. In this respect, because of the manner in which such a coupling is structured, the delay chamber has only a small volume in order to avoid problems in transferring the fluid from the delay chamber to the working chamber, and in any event it is desirable to limit the overall size of the coupling. Consequently the amount of fluid which can be contained in such a chamber is likewise limited, meaning that the lag period obtainable with such a coupling is also limited.

Other couplings allowing a longer lag in connecting the engine to the user are also known. Such couplings are however of complicated construction in that they use a reservoir external to the coupling to contain the fluid to be fed to the coupling, plus external circulation pumps.

OBJECTS AND SUMMARY OF THE INVENTION

An object of the present invention is to provide a fluid coupling which achieves a lag in connecting the engine to the user such as to allow optimum heating of the engine, such as a diesel engine, or the certain attainment of a predetermined r.p.m. beyond which motion is transferred from the engine to the user.

A further object of the invention is to provide a coupling of the stated type which is of small dimensions and contains within itself all parts required to achieve the desired lag.

A further object is to provide a coupling of the stated type which is of simple construction.

A further object is to provide a coupling of the stated type which enables the lag in coupling the driving rotor to the driven rotor to be varied in a simple manner.

A further object is to provide a coupling of the stated type which offers considerable safety should the driven shaft seize with consequent overheating of the motion transmission fluid.

These and further objects which will be apparent to the expert of the art are attained by a coupling in accordance with the characterizing part of the main claim and with the other accompanying claims.

BRIEF DESCRIPTION OF THE DRAWINGS

The present invention will be more apparent from the accompanying drawing, which is provided by way of non-limiting example and in which.

DETAILED DESCRIPTION OF THE INVENTION

Figure 1:
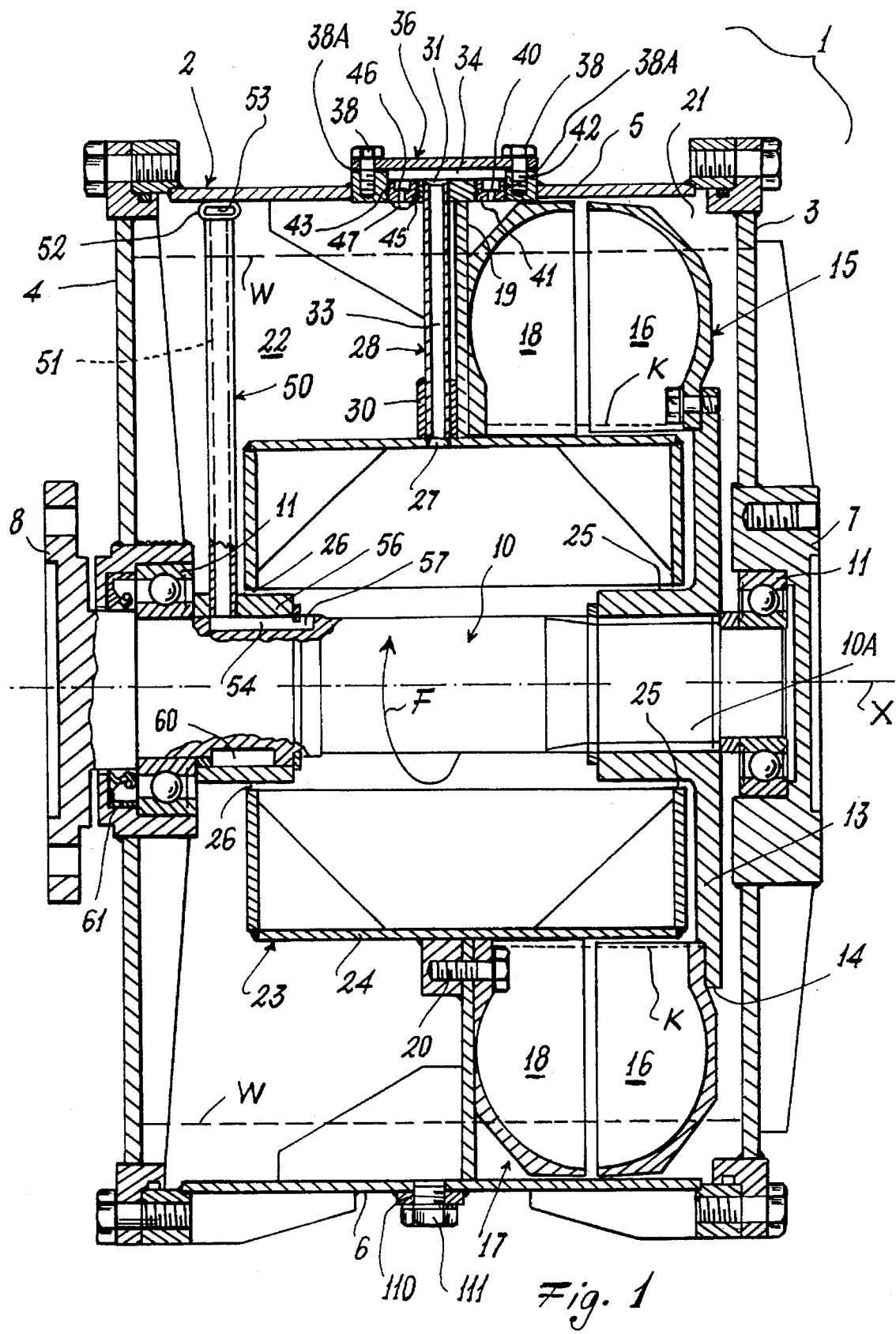
FIG. 1 is a longitudinal section through a coupling according to the invention.

With reference to FIG. 1, a fluid coupling is indicated overall by 1 and comprises a usual sealed casing 2 consisting of sides 3 and 4, a top 5 and a bottom 6, shown in cross-section. To the side 3 there is fixed a usual connection element for a prime mover, for example an electric motor or a heat engine (diesel), not shown, while on the side 4 there is a flange 8 for connection to a user (not shown). The flange 8 is connected to a usual driven shaft 10, positioned within the casing 2 along its longitudinal axis and supported by ball bearings 11 in proximity to the sides 3 and 4 of said casing.

At that end 10A thereof close to the side 3, the driven shaft 10 supports a flange 13 which in proximity to its outer edge 14 supports a semi-toroidal rotor 15 (known as the driven rotor) of known type provided with radial blades 16. This rotor faces a second semi-toroidal rotor 17 (known as the driving rotor) provided with radial blades 8, which is fixed to a wall 19 inside the sealed casing 2. As this latter is arranged to be torsionally coupled to the driving shaft, he driving rotor 17 is to be considered operationally connected to the driving shaft when this latter and the coupling have been connected together. The driving rotor 17 is normally fixed to the wall 19 by screws 20.

The rotors 15 and 17 are located in a first chamber 21 of the casing 2, known as the working or rotor chamber. This casing comprises a chamber 22 in the form of a buffer or reservoir which is separated from the first chamber by the wall 19. These chambers contain in known manner a fluid (not shown) for transmitting motion from the driving rotor to the driven rotor.

Within the casing 2 there is a further chamber 23 acting as a delay chamber to delay fluid passage from the chamber 22 to the rotor chamber 21.

With reference to FIG. 1, the delay chamber 23 comprises an annular structure 24 associated with the wall 19 (which for this reason extends only partially within the casing 2). This structure defines an annular cylindrical chamber positioned about the shaft 10 but open onto this latter, and communicating via lateral ports 25 and 26 with the chambers 21 and 22 respectively.

From a peripheral aperture 27 provided in the structure 24, a tubular member 28 extends from the delay chamber 23 and is fixed to the delay chamber and to the wall 19 by means of a support sleeve 30 (lowerly, in FIG. 1, with respect to the member 28), to terminate, with reference to FIG. 1, at an aperture provided in the upper wall 5 of the casing 2. A duct 33 provided in the member 28 communicates, via said aperture 27 and an aperture 31, with the delay chamber 23 and with a peripheral transit chamber 34 provided on the wall 5 and defined by this latter and a peripheral element 36 sealedly fixed to the wall 5 by screws 38 and seal elements 38A. The peripheral transit chamber 34 communicates with the chamber 21 via a sized hole 40 provided in a body 41 removably insertable (for example by screwing) into a seat 42 (for example threaded) provided in the wall 5. The body 41 can hence be easily removed from the seat 42 and replaced with a similar body having a different diameter hole.

In a similar seat 43 in the wall 5 there is positioned an insert 45 provided with a duct 46 connecting the chamber or reservoir 22 to the chamber 34 and in which there is a piece of fusible material 47 which melts at a temperature lower than the open-cup flammability point of the oil.

The chamber 22 contains a tubular element 50 with its internal duct 51 opening into said chamber or reservoir at at least one end 52, which is bent in the opposite direction to the direction of rotation of the coupling (which in the example is indicated by the arrow F). Consequently in the figure this end is shown bent perpendicular to the plane of the drawing and is open at 53 to connect the duct 51 to the chamber 22.

The tubular element 50 is rigid with the driven shaft, which comprises a groove 54 into which the duct 51 lowerly opens. This groove is partly enclosed by an annular element 56 made rigid with the shaft 10 by a key 60 (and supporting the element 50), and opens at 57 below the delay chamber 23 in correspondence with a portion (the upper portion in FIG. 1) of the structure 24 of this latter.

Finally, a seal element 61 is positioned at the bearing 11 about the driven shaft 10.

It will now be assumed that the coupling of FIG. 1 is to be used to transfer motion from a motor, connected to the element 7, to a user connected to the flange 8 and hence to the driven shaft 10. It will also be assumed that the motor is originally at rest. Under these conditions, the motion transmission fluid (oil) is held by gravity in the lower part (with reference to FIG. 1) of the casing 2, with its level exceeding the passages 25 and 26. On starting the motor, the casing 2 and driving rotor 17 begin to rotate and the fluid present in the casing begins to distribute itself radially within the chambers 21 and 22 (because of the centrifugal force deriving from said rotation). However a large quantity of the fluid is present in the chamber or reservoir 22, which is normally of greater volume, whereas only a small quantity is present in the working chamber 21. As there is only a small amount of oil in the chamber 21 due to the fact that when at rest it is filled to below the axis X of the coupling, the motor is able to pick up speed without being influenced by the braking action of the user. This is because the fluid present in the chamber 21 in only small quantity is unable to transfer the motion of the rotor 17 to the rotor 15.

As the motor r.p.m. increases, the velocity of the fluid present in the peripheral part of the chamber or reservoir 22 increases so that this fluid is forced to penetrate into the duct 51 through the aperture 53 in the end 52 of the element 50 fixed to the driven shaft 10, which is still substantially at rest. This fluid passes through the duct 51, penetrates into the seat 54 and passes into the delay chamber 23, gradually becoming distributed peripherally within this latter.

Because of the rotation of the casing 2 and hence of the consequent continuous penetration of fluid into the duct 51, more fluid continuously passes into the delay chamber 23. From there it passes into the duct 33 by centrifugal effect to reach the chamber 34 and pass through the sized hole 40 into the working chamber 21. This latter gradually fills, and likewise gradually there is transfer of motive power from the rotor 17 to the rotor 15. When under full working conditions the chamber 21 is full of fluid, so that the entire available power (except for the usual pressure drops) is transmitted to the rotor 15. The shaft 10 therefore rotates in unison (except for usual slippage) with the casing 2, with consequent attainment of a state of equilibrium between the driving shaft and the driven shaft. When in this state the entire fluid of the chamber or reservoir 22 has been transferred to the chamber 21.

It should be noted that by virtue of the invention, and in particular the volume of the chamber 22 (equal to at least one half the internal volume of the casing 2), a large quantity of fluid can fill the chamber 21 and involve the entire extension of the blades 16 and 18 of the rotors (see the lines K in FIG. 1), which cannot be achieved with known arrangements even if large-dimension delay chambers are provided therein.

Moreover, if for any reason the driven shaft should seize, with consequent overheating of the fluid present in the working chamber 21, this fluid, which is present in the chamber 34, would melt the valve body 47. The duct 46 would consequently be freed and the fluid would return, with cooling, into the chamber or reservoir 22, and in time a situation of equilibrium would be attained in which in both the chambers 21 and 22 a constant fluid level (represented by the lines W in FIG. 1) is present. In this situation the fluid which has returned to the chamber or reservoir 22 rises in the duct 51 and passes into the delay chamber 23. A state of equilibrium is hence attained in which the fluid present in the casing 2 is partly in the chambers 21 and 22, whereas it completely fills the delay chamber 23. Consequently this fluid, being in minimum quantity in the chamber 21, produces little heat and hence cools continuously. This situation can hence continue in time without damage to the coupling.

Consequently the invention provides a considerable improvement in terms of safety compared with arrangements of the known art in which, in situations similar to that described, the fluid is expelled from the coupling with obvious danger to possible machine personnel present in the vicinity.

Finally, the casing 2 comprises (lowerly in FIG. 1) a duct 110 closed by a screw member 111 for inserting the motion transmission fluid into the chambers 21 and 22 and for extracting it from the casing 2.

Figure 2:
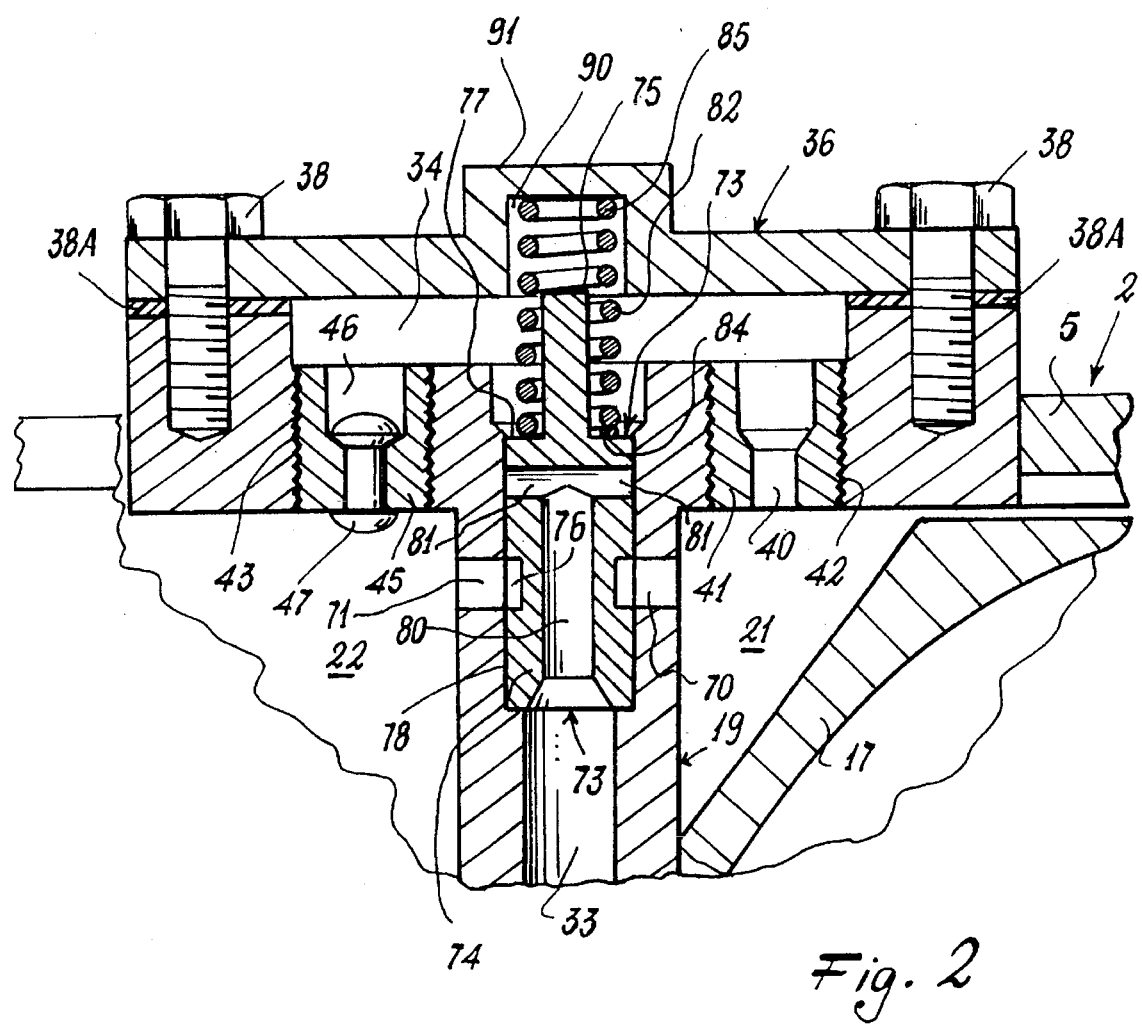
FIG. 2 is an enlarged view of part of a modification of the coupling of FIG. 1.

FIG. 2 shows a modification of the invention particularly for use with a heat engine, for example a diesel engine.

In this figure, in which parts corresponding to those already described in relation to FIG. 1 are indicated by the same reference numerals, the duct 33 is provided directly within the wall 19 separating the working chamber 21 from the reservoir 22. Two opposing passages 70 and 71 are provided in the wall. In the duct 33 there is also positioned a valving member 73 comprising a substantially cylindrical body 74 provided upperly with a projection 75 extending from the end 77 of this body, this latter comprising an annular recess 76 formed within its side wall 78. The valving member 73 comprises an internal duct 80 opening into the wall 78 via radial channels 81.

Finally, the valving member 73 is subjected to the action of a spring 82 having one end 84 cooperating with said member and one end 85 cooperating with the peripheral element and positioned within a cavity 90 in a socket-shaped part of said element. By virtue of the described modification the connection between the chamber 23 and the working chamber 21 can be interrupted when the engine, for example a diesel engine, operates at low r.p.m., for example 800 r.p.m., during the preheating stage.

Under these conditions, the rotation of the coupling 1 is unable to impress on the fluid (operating on the valving member jointly with the centrifugal force) a velocity such that the fluid, rising within the duct 33, is able to overcome (with the increase in centrifugal force) the action of the spring 82 on the valving member 73, which hence remains closed. In this situation the fluid cannot enter the chamber 34 and then the chamber 21. Consequently during the preheating stage, ie at low engine r.p.m., the chamber 21 contains very little fluid (whereas the delay chamber is completely full), which situation can be maintained indefinitely.

With the increase in r.p.m., the action on the member 73 of the fluid in the duct 33 and of the centrifugal force increases until the force of the spring 82 is overcome. In this situation the body 74 of this member slides within the duct 33, with the result that the radial channels 81 opening into the wall 78 of this body move to the outside of the duct, and the wall 78 occludes the passages 70 and 7 within the wall 9. Hence, via the duct 33, the duct 80 and the channels 81 the fluid is able to reach the chamber 32 and then the chamber 21, to restore the condition described in relation to the use of the coupling of FIG. 1.

When the engine again operates at low r.p.m. the member 73 returns to the position of FIG. 2 to upperly occlude the duct 33 and free the connection between the passages 70 and 71 via the annular recess 76. Under these conditions the fluid present in the chamber 21 passes into the reservoir 22, the driving rotor 17 is no longer able to transfer the drive torque to the driven rotor 15, and the engine can idle without the user being driven. It should be noted that when the valving member enables the fluid to pass from the duct 33 to the chamber 34, the projection 75 becomes positioned within the cavity 80 in the part 91 of the peripheral element 36 such as to rest against it. By this means the spring 82 is not stressed excessively, so preventing it from yielding during the use of the coupling. The projection 75 hence acts as a limit stop for the movement of the member 73 towards the element 36.

Two different embodiments of the invention have been described. However further embodiments are possible (such as one for example comprising several mutually communicating delay chambers 23 in succession or comprising a valving member in the duct 33 of FIG. 1 which differs from that described and/or is able simply interrupt the flow of fluid from the chamber 23 to the chambers 34 and 21 without it being possible to connect the working chamber to the reservoir at low engine r.p.m.) while remaining within the scope of the present document.

I claim:

1. A fluid coupling (1) with a sealed casing (2) comprising two mutually communicating chambers (21, 23) and traversed by a driven shaft (10) connected to a user, one of said chambers (21) containing a pair of rotors (15, 7) provided with radial blades (16, 18), a driving first rotor (17) being operationally connected to a driving shaft and the driven second rotor (15) being associated with the driven shaft (10), the other chamber (23) acting as a delay chamber, the casing (2) containing a fluid arranged to transfer motion from the driving rotor (17) to the driven rotor (15), characterized in that within the sealed casing (2) there is provided at least one further chamber or reservoir (22) connected to said two chambers (21, 23) to feed the fluid contained in it to the delay chamber (23) with a delay subsequent to the starting of the motor, said fluid being transferred with a further delay to the working chamber (21) containing the rotors (15, 17).

2. A fluid coupling as claimed in claim 1, characterized in that the chamber or reservoir (22) contains a tubular element (50) provided with an internal duct (51) and having at least one end (52) bent in the opposite direction to the direction of rotation of the coupling (1), said duct (51) opening (53) into said end, said tubular element (50) being rigid with the driven shaft (10), in which there is provided a groove (54) into which the internal duct (51) of said tubular element (50) opens, said groove (54) opening into the delay chamber (23).

3. A fluid coupling as claimed in claim 1, characterized in that the delay chamber (23) comprises an annular structure (24) supported by a dividing wall (19) interposed between the working chamber (21) and the reservoir (22), said delay chamber (23) comprising at least one peripheral aperture (27) opening into a duct (33) provided in a tubular element (28, 19) connected to said chamber (23) and enabling the motion transfer fluid to reach the working chamber (21) to which said duct (33) is operationally connected.

4. A fluid coupling as claimed in claim 3, characterized in that the tubular element is defined by the wall (19) supporting the delay chamber (23), the duct (33) which opens into said delay chamber being provided within said wall.

5. A fluid coupling as claimed in claim 3, characterized in that the duct (33) within the tubular element (28, 19) opens into a transit chamber (34) to which the working chamber (21) is connected, said transit chamber being defined by a part of the sealed casing (22) and by a peripheral element (36) associated with it.

6. A fluid coupling as claimed in claim 3, characterized in that the fluid from the duct (33) provided in the tubular element (28) enters the working chamber (21) through a sized hole (40) provided in a body (41) advantageously removably associated with the sealed casing (2), the diameter of said hole being able to be varied by changing said body (41).

7. A fluid coupling as claimed in claim 6, characterized in that the sized hole opens into the transit chamber (34), between this latter and the reservoir (22) there being provided a further duct (46) formed in a body (45) advantageously removably associated with the sealed casing (2), a fusible body being provided in said duct (46).

8. A fluid coupling as claimed in claim 3, characterized by comprising, within the duct (33) connecting the delay chamber (23) to the working chamber (21), valve means (73) arranged to close said duct on the basis of the motor r.p.m.

9. A fluid coupling as claimed in claim 8, characterized in that the valve means (73) provide communication between the working chamber (21) and the reservoir (22) when the motor r.p.m. is less than a predetermined value.

10. A fluid coupling as claimed in claim 8, characterized in that the valve means are a valving member (73) movable relative to the duct (33) against the action of a spring (82).

11. A fluid coupling as claimed in claim 8, characterized in that the valving member (73) comprises a body (74) provided with passage means (76, 80, 81) arranged to connect the working chamber (21) to the reservoir (22) or the delay chamber (23) to the working chamber (21).

12. A fluid coupling as claimed in claim 3, characterized in that the tubular element (19) in which the duct (33) is provided comprises, in its wall, passages (70, 71) arranged to provide communication between the working chamber (21) and the reservoir (22) only when the valve means (33) are in particular positions, or only following the attainment of a predetermined low motor r.p.m.

* * * * *